United States Patent
Liu

(10) Patent No.: US 10,053,106 B2
(45) Date of Patent: Aug. 21, 2018

(54) VEHICLE BODY STATE QUANTITY ESTIMATING DEVICE

(71) Applicant: TOYOTA JIDOSHA KABUSHIKI KAISHA, Toyota-shi, Aichi-ken (JP)

(72) Inventor: Yanqing Liu, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 148 days.

(21) Appl. No.: 15/064,047

(22) Filed: Mar. 8, 2016

(65) Prior Publication Data
US 2016/0264148 A1 Sep. 15, 2016

(30) Foreign Application Priority Data
Mar. 11, 2015 (JP) .................. 2015-048734

(51) Int. Cl.
*B60W 40/06* (2012.01)
*B60W 50/00* (2006.01)

(52) U.S. Cl.
CPC ..... *B60W 40/06* (2013.01); *B60W 2050/0031* (2013.01); *B60W 2520/28* (2013.01)

(58) Field of Classification Search
CPC ............. B60W 40/06; B60W 2520/28; B60W 2050/0031
See application file for complete search history.

(56) References Cited

U.S. PATENT DOCUMENTS
2014/0005889 A1 1/2014 Hayakawa

FOREIGN PATENT DOCUMENTS

| JP | 2010-203455 A | 9/2010 |
|---|---|---|
| JP | 2011-17303 A | 1/2011 |
| JP | 2014-8884 A | 1/2014 |
| JP | 2014-8888 A | 1/2014 |
| JP | 2014-19252 A | 2/2014 |
| JP | 2014-19335 A | 2/2014 |

*Primary Examiner* — Alan D Hutchinson
(74) *Attorney, Agent, or Firm* — Sughrue Mion, PLLC

(57) ABSTRACT

A device includes a road surface input calculating unit that calculates an estimated value of a road surface input to the wheel, by letting an inverse matrix of a product of a vehicle motion model matrix and a wheel speed influencing element model matrix act on a wheel speed of a vehicle. The vehicle motion model matrix represents a mechanical vehicle motion model, and the wheel speed influencing element model matrix using a quantity of influence due to pitch about a center of gravity of a vehicle body, a suspension geometry influence quantity, and a quantity of influence of a change in a rolling radius of the wheel. The device also includes a vehicle body state quantity calculating unit that calculates an estimated value of a vehicle body state quantity by letting the vehicle motion model matrix on the calculated estimated value of the road surface input.

4 Claims, 6 Drawing Sheets

VEHICLE BODY STATE QUANTITY ESTIMATING DEVICE

INCORPORATION BY REFERENCE

The disclosure of Japanese Patent Application No. 2015-048734 filed on Mar. 11, 2015 including the specification, drawings and abstract is incorporated herein by reference in its entirety.

BACKGROUND OF THE INVENTION

1. Field of the Invention

The invention relates to a vehicle body state quantity estimating device.

2. Description of Related Art

A technology of calculating pitch of a vehicle body from wheel torque calculated using a time differential value of the wheel speed is disclosed (in Japanese Patent Application Publication No. 2011-17303 (JP 2011-17303 A)). Also, a technology of ensuring the accuracy in estimation of vertical force applied from a road surface to a wheel, based on fluctuations in the wheel speed, is disclosed (in Japanese Patent Application Publication No. 2014-19252 (JP 2014-19252 A)). Further, a technology of estimating fluctuations in the vertical load on the wheel, based on fluctuations in the wheel speed, is disclosed (in Japanese Patent Application Publication No. 2014-8884 (JP 2014-8884 A)). The above-described technologies are used for estimation of vehicle body state quantities and control, such as damping control, of the vehicle based on the estimation. Here, the vehicle body state quantities include pitch, bounce, etc. of the vehicle body.

However, it is desired to estimate the vehicle body state quantities with higher accuracy, so as to control the vehicle with higher accuracy.

SUMMARY OF THE INVENTION

The invention has been developed in view of the above situation, and provides a vehicle body state quantity estimating device that can estimate vehicle body state quantities with improved accuracy.

A vehicle body state quantity estimating device according to a first aspect of the invention is a vehicle state quantity estimating device adaptable to a vehicle including a wheel speed sensor that obtains a wheel speed of a wheel mounted on the vehicle. The vehicle state quantity estimating device includes a road surface input calculating unit that calculates an estimated value of a road surface input to the wheel, by letting an inverse matrix of a product of a vehicle motion model matrix and a wheel speed influencing element model matrix act on the obtained wheel speed. The vehicle motion model matrix represents a mechanical vehicle motion model of the vehicle, and the wheel speed influencing element model matrix represents a wheel speed influencing element model using three wheel speed influencing elements as elements that influence the wheel speed. The wheel speed influencing elements include a quantity of influence due to pitch about a center of gravity of a vehicle body, a suspension geometry influence quantity, and a quantity of influence of a change in a rolling radius of the wheel. The estimating device also includes a vehicle body state quantity calculating unit that calculates an estimated value of a vehicle body state quantity by letting the vehicle motion model matrix on the estimated value of the road surface input calculated by the road surface input calculating unit.

In the vehicle body state quantity estimating device according to the first aspect of the invention, a normalized moment of inertia of the vehicle body of the vehicle may be 1, in the vehicle motion model, and the wheel speed may include a wheel speed of a front wheel of the vehicle and a wheel speed of a rear wheel of the vehicle, while the road surface input may include a road surface input to the front wheel of the vehicle and a road surface input to the rear wheel. The road surface input calculating unit may calculate an estimated value of a road surface input to the front wheel, by letting elements of the inverse matrix associated with the front wheel act on the obtained wheel speed of the front wheel, and calculate an estimated value of a road surface input to the rear wheel, by letting elements of the inverse matrix associated with the rear wheel act on the obtained wheel speed of the rear wheel. Thus, the estimated value associated with the front wheel and the estimated value associated with the rear wheel are calculated independently of each other, so that the load of computation on the vehicle body state quantity estimating device is reduced.

In the vehicle body state quantity estimating device according to the first aspect of the invention, a normalized moment of inertia of the vehicle body of the vehicle may be 1, in the vehicle motion model, and the wheel speed may be a wheel speed of a front wheel of the vehicle. The road surface input calculating unit may calculate an estimated value of a road surface input to the front wheel, by letting elements of the inverse matrix associated with the front wheel act on the obtained wheel speed of the front wheel, and calculate an estimated value of a road surface input to a rear wheel, by letting a wheel base delay amount of the vehicle act on the estimated value of the road surface input to the front wheel. Thus, the estimated value of the road surface input to the rear wheel is calculated using the estimated value of the road surface input to the front wheel, and subsequent calculation of estimated values is conducted independently or separately with respect to the front wheel and the rear wheel, so that the load of computation on the vehicle body state quantity estimating device is reduced.

A damping control system of a vehicle according to a second aspect of the invention includes a sensor that obtains a wheel speed of the vehicle, and an electronic control unit configured to i) calculate an estimated value of a road surface input to the wheel, by letting an inverse matrix of a product of a vehicle motion model matrix and a wheel speed influencing element model matrix act on the obtained wheel speed, the vehicle motion model matrix representing a mechanical vehicle motion model of the vehicle, the wheel speed influencing element model matrix representing a wheel speed influencing element model using three wheel speed influencing elements as elements that influence the wheel speed, the wheel speed influencing elements comprising a quantity of influence due to pitch about a center of gravity of the vehicle body, a suspension geometry influence quantity, and a quantity of influence of a change in a rolling radius of the wheel, calculate an estimated value of a vehicle body state quantity by letting the vehicle motion model matrix act on the calculated estimated value of the road surface input, and iii) control a power source of the vehicle based on the estimated value of the vehicle body state quantity.

According to the invention, the estimated value of the road surface input to the wheel is calculated by letting the inverse matrix of the product of the vehicle motion model matrix and the wheel speed influencing element model matrix act on the wheel speed obtained by the wheel speed sensor, and the estimated value of the vehicle body state quantity is calculated by letting the vehicle motion model matrix further act on the estimated value of the road surface input thus calculated. In the calculation, the wheel speed influencing element mode matrix representing a wheel speed influencing element model using at least three wheel speed influencing elements, i.e., the quantity of influence due to pitch about the center of gravity of the vehicle body, suspension geometry influence quantity, and the quantity of influence due to change in the rolling radius of the wheel, is used. The use of the wheel speed influencing element mode matrix makes it possible to calculate the estimated value of the vehicle body state quantity involving the influences of the three wheel speed influencing elements on the wheel speed; therefore, the vehicle body state quantity can be advantageously estimated with improved accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 3A, 3B are views useful for explaining the quantity of influence due to pitch about the center of gravity of the vehicle body as an element influencing the wheel speed, wherein FIG. 3A is a view before pitch occurs, and FIG. 3B is a view after pitch occurs;

FIGS. 9A-9C are views showing estimated values and actual measured values of the pitch rate in one example of the vehicle body state quantity estimating device according to the first embodiment, and transfer functions relating to these values, wherein FIG. 9A shows changes in the estimated value and actual measured value of the pitch rate with time, FIG. 9B shows a frequency distribution of the gain ratio of values obtained by dividing the estimated values by the actual measured values, using logarithmic axes, and FIG. 9C shows a frequency distribution of the phase ratio of values obtained by dividing the estimated values by the actual measured values, using logarithmic axes.

DETAILED DESCRIPTION OF EMBODIMENTS

Figure 1A:
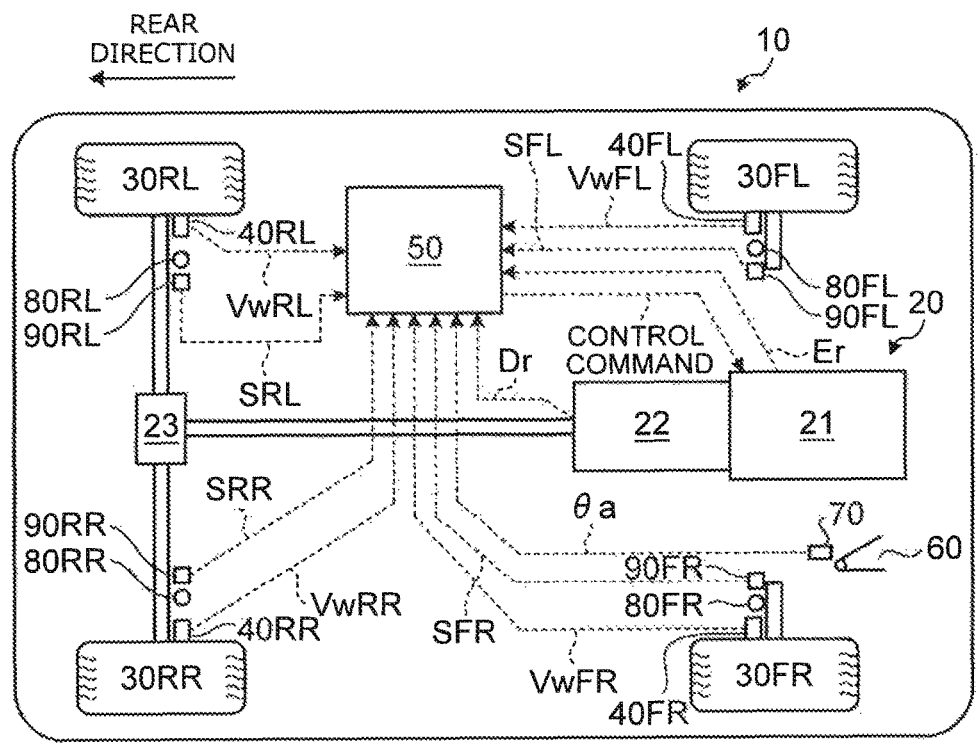
FIG. 1A is a view showing an example of general configuration of a vehicle in which a vehicle body state quantity estimating device according to a first embodiment of the invention is used.

Referring to the drawings, vehicle body state quantity estimating devices according to some embodiments of the invention will be described in detail. It is to be understood that this invention is not limited to these embodiments.

First Embodiment

Figure 1B:
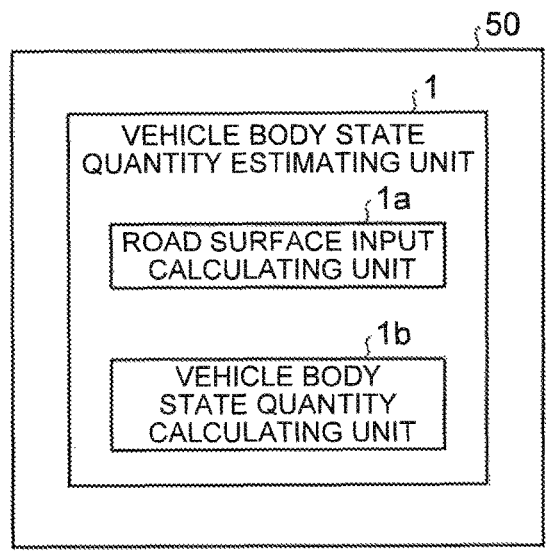
FIG. 1B is a view showing the general configuration of the vehicle body state quantity estimating device according to the first embodiment.

FIG. 1A and FIG. 1B illustrate an example of general configuration of a vehicle in which a vehicle body state quantity estimating device according to a first embodiment of the invention is used. On the vehicle 10 illustrated in FIG. 1, an internal combustion engine, such as a gasoline engine, diesel engine, or a liquefied petroleum gas (LPG) engine, is installed as a power source 21. However, the power source 21 may be an electric machine, such as a motor, or may include both an electric machine, such as a motor, and an internal combustion engine.

The power source 21 is installed in a front portion of the vehicle 10 as viewed in the direction of travel of the vehicle 10, and the vehicle 10 is a rear-wheel-drive vehicle using left and right rear wheels 30RL, 30RR as drive wheels. In this connection, the installation position of the power source 21 of the vehicle 10 is not limited to the front portion, but the power source 21 may be installed in a rear portion or middle portion of the vehicle 10. Also, the drive type of the vehicle 10 is not limited to the rear-wheel drive, but may be any of other drive types, such as front-wheel drive using left and right front wheels 30FL, 30FR as drive wheels, and four-wheel drive.

As shown in FIG. 1B, a vehicle body state quantity estimating unit 1 as the vehicle body state quantity estimating device is realized by functions of an electronic control unit (ECU) 50 (which will be described later) installed on the vehicle 10. However, the vehicle body state quantity estimating unit 1 is not limited to the ECU 50, but may be constituted by an ECU other than the ECU 50, and may be connected to the ECU 50.

As shown in FIG. 1A, the vehicle 10 in which the vehicle body state quantity estimating unit 1 is used has an accelerator pedal 60 operated by a driver, and an accelerator pedal sensor 70, in addition to four wheels. The accelerator pedal sensor 70 detects an accelerator pedal depression amount $\theta a$ as an amount of depression of the accelerator pedal 60, and outputs an electric signal corresponding to the accelerator pedal depression amount $\theta a$ to the ECU 50. The vehicle 10 includes the power source 21, and a drive-train 20 configured to transmit power (drive torque) generated by the power source 21 to the wheels 30RL, 30RR, via a transmission (including a torque converter, for example) 22, a differential device 23, and so forth. The vehicle 10 also includes suspension mechanisms 80FL, 80FR, 80RL, 80RR that connect the vehicle body of the vehicle 10 with the wheels 30FL, 30FR, 30RL, 30RR, respectively, and stroke sensors 90FL, 90FR, 90RL, 90RR that detect the stroke amounts of the suspension mechanisms 80FL, 80FR, 80RL, 80RR, respectively, and output signals indicative of the stroke amounts SFL, SFR, SRL, SRR. The vehicle 10 further includes wheel speed sensors 40FL, 40FR, 40RL, 40RR that are provided in respective wheels and output signals indicative of the wheel speeds VwFL, VwFR, VwRL, VwRR of the respective wheels. Although not illustrated in the drawings, the vehicle 10 is provided with a steering device for controlling the steering angles of the front wheels or front and rear wheels, like various known vehicles.

The drive-train 20 is controlled by the ECU 50 including the vehicle body state quantity estimating unit 1. The ECU 50 includes a microcomputer having CPU, ROM, RAM and an input/output port device, which are connected to each other via a bidirectional common bus of any of various known types, and a drive circuit. The ECU 50 receives various signals from sensors provided in respective parts of the vehicle 10. The signals include those indicative of the wheel speeds VwFL, VwFR, VwRL, VwRR, the stroke amounts SFL, SFR, SRL, SRR, the engine speed (the output rotational speed of the power source 21, or the rotational speed of an output shaft of a motor when the power source 21 is the motor) Er, the output rotational speed Dr of the transmission 22, the accelerator pedal depression amount θa, parameters corresponding to operating circumstances of the power source 21, and the shift position of a shift lever (not shown) provided in the vehicle 10. When the power source 21 is a gasoline engine, the above-indicated parameters include the coolant temperature, intake air temperature, intake air pressure, atmospheric pressure, throttle opening, fuel injection amount, fuel injection timing, and the ignition timing. When the power source 21 is a motor, the parameters include the amount of current supplied to the motor, and the state of charge (SOC) of a battery. The ECU 50 also receives various detection signals, other than those as indicated above, so as to obtain various parameters required for various controls that should be executed (performed) in the vehicle 10 of the first embodiment.

Next, the vehicle body state quantity estimating unit 1 will be described. As shown in FIG. 1B, the vehicle body state quantity estimating unit 1 includes a road surface input calculating unit 1a, and a vehicle body state quantity calculating unit 1b.

The road surface input calculating unit 1a is configured to calculate estimated values of road surface inputs to the wheels 30FL, 30FR, 30RL 30RR, by letting a predetermined inverse matrix act on the wheel speeds VwFL, VwFR, VwRL, VwRR obtained from the wheel speed sensors 40FL, 40FR, 40RL, 40RR, respectively.

The vehicle body state quantity calculating unit 1b calculates estimated values of vehicle body state quantities by letting a vehicle motion model matrix act on the estimated values of road surface inputs calculated by the road surface input calculating unit 1a.

The road surface input calculating unit 1a and the vehicle body state quantity calculating unit 1b will be more specifically described. The road surface input calculating unit 1a calculates estimated values of road surface inputs to the wheels 30FL, 30FR, 30RL, 30RR, by letting a predetermined inverse matrix act on the wheel speeds VwFL, VwFR, VwRL, VwRR. Here, the predetermined inverse matrix is the inverse of a matrix as a product of a vehicle motion model matrix representing a mechanical vehicle motion model of the vehicle, and a wheel speed influencing element model matrix representing a wheel speed influencing element model including elements that influence the wheel speed.

Figure 2A:
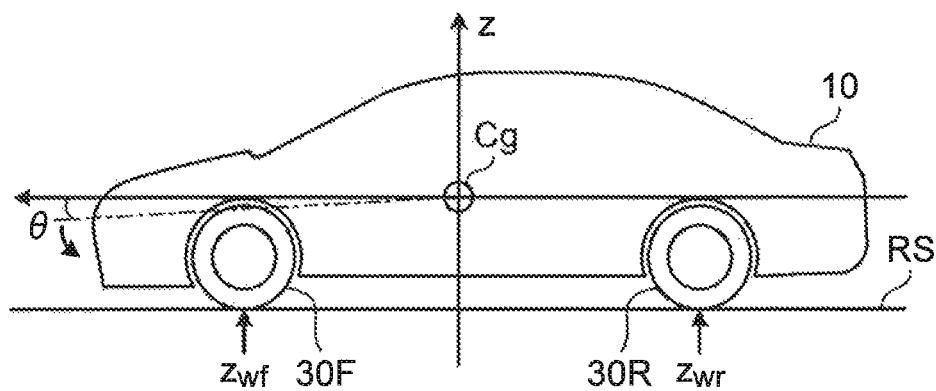
FIGS. 2A and 2B are views useful for explaining one example of a mechanical vehicle motion model of the vehicle used in the vehicle body state quantity estimating device according to the first embodiment.
Figure 2B:
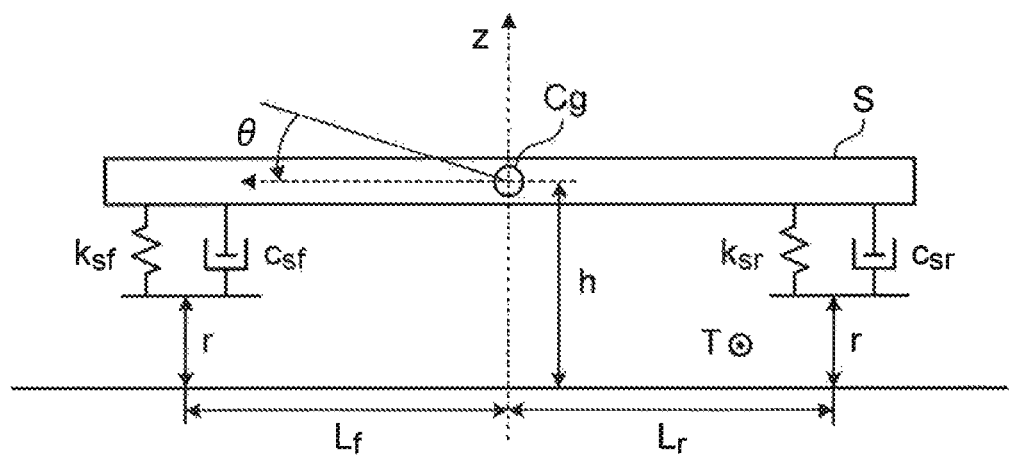

Next, the mechanical vehicle motion model of the vehicle 10 will be described. FIG. 2A and FIG. 2B are views useful for explaining one example of mechanical vehicle motion model of a vehicle, which is used in the vehicle state quantity estimating device according to the first embodiment.

As shown in FIG. 2A, in the vehicle body of the vehicle 10, bounce vibration (vibration in the bounce direction) of the center of gravity Cg of the vehicle body in the vertical direction (z direction), and pitch vibration (vibration in the pitch direction) in the pitch direction (θ direction) about the center of gravity of the vehicle body are specified. In the model of FIG. 2A, a bicycle model is used in which the wheels are represented by a wheel 30F as a front wheel and a wheel 30R as a rear wheel. In FIG. 2A, $z_{wf}$, $z_{wr}$ are road surface inputs to the wheel 30F and the wheel 30R from the road surface RS, and, specifically, changes in the level of the road surface RS in the z direction.

In the mechanical vehicle motion model concerning the bounce direction or pitch direction of the vehicle body of the vehicle 10, as shown in FIG. 2B by way of example, the vehicle body is regarded as a rigid body S having a mass $m_b$ and a moment of inertia $I_p$, and the rigid body S is assumed to be supported by a front-wheel suspension having a modulus of elasticity $k_{sf}$ and a damping rate $c_{sf}$ and a rear-wheel suspension having a modulus of elasticity $k_{sr}$ and a damping rate $c_{sr}$ (a sprung-mass vibration model of the vehicle body of the vehicle 10). In FIG. 2B, r is the radius of the wheel, and h is the height of the center of gravity Cg from the road surface, while $L_f$, $L_r$ are distances from the center of gravity Cg to the axle of the front wheel and the axle of the rear wheel, respectively, and T is drive torque applied to the rear wheel. In this case, an equation of motion in the bounce direction of the gravity center Cg of the vehicle body (a mechanical motion model in the bounce direction), and an equation of motion in the pitch direction (a mechanical motion model in the pitch direction) can be expressed by the following equations (1).

$$m_b \ddot{z}_b = 2F_{zf} + 2F_{zr}$$

$$I_p \ddot{\theta}_p = -2F_{zf} L_f + 2F_{zr} L_r$$

$$F_{zf} = k_{sf} z_{sf} + c_{sf} \dot{z}_{sf}$$

$$F_{zr} = k_{sr} z_{sr} + c_{sr} \dot{z}_{sr} \qquad (1)$$

In Eqs. (1) above, $z_b$ is a coordinate in the z direction of the center of gravity Cg, and $z_{sf}$, $z_{sr}$ are coordinates in the z direction of the centers of the wheels 30F, 30R, respectively, while $F_{zf}$, $F_{zr}$ are forces applied from the road surface to the wheels 30F, 30R, respectively. $\theta_p$ is a pitch angle about the center of gravity of the vehicle body.

In this connection, $z_{sf}$, $z_{sr}$, $z_{bf}$, $z_{br}$ may be expressed by the following equations (2), where $z_{bf}$, $z_{br}$ are coordinates of a line passing the center of gravity Cg and extending in parallel to the longitudinal direction of the vehicle 10, on the axle of the front wheel and the axle of the rear wheel.

$$z_{sf} = z_{wf} - z_{bf}$$

$$z_{sr} = z_{wr} - z_{br}$$

$$z_{bf} = z_b - \theta_p L_f$$

$$z_{br} = z_b + \theta_p L_r \qquad (2)$$

In this case, dz/dt, dθ/dt as vehicle body state quantities, and state variables $F_{zf}$, $F_{zr}$, $dz_{sf}/dt$, $dz_{sr}/dt$ may be expressed with respect to $z_{wf}$, $z_{wr}$, using a given matrix A(t). If this expression is subjected to Laplace transform, it may be expressed by the following equation (3):

$$\begin{pmatrix} z \\ \theta \\ F_{zf} \\ F_{zr} \\ z_{sf} \\ z_{sr} \end{pmatrix} = A(s) \begin{pmatrix} z_{wf} \\ z_{wr} \end{pmatrix} \quad (3)$$

where $s=j\omega$, and the matrix $A(s)$ is a 6×2 matrix. The matrix $A(s)$ may be expressed as indicated in Eq. (6) below, using Tf, Tr indicated in Eqs. (4) and matrices A1, B1, C1, D1, E1, F1 indicated in Eqs. (5). While $dz/dt$, $d\theta/dt$, $dz_{sf}/dt$, $dz_{sr}/dt$ are converted into $zs$, $\theta s$, $z_{sf}s$, $z_{sr}s$ through the Laplace transform, s is included in the matrix $A(s)$ in the Eq. (3) above, in the following, the matrix $A(s)$ will be simply denoted as "matrix A".

$$T_f = k_{sf} + c_{sf}s \quad (4)$$
$$T_r = k_{sr} + c_{sr}s$$

$$A1 = \begin{bmatrix} m_b s^2 + 2T_f + 2T_r & -2T_f L_f + 2T_r L_r \\ -2T_f L_f + 2T_r L_r & I_p s^2 + 2T_f L_f^2 + 2T_r L_r^2 \end{bmatrix}, \quad (5)$$

$$C1 = \begin{bmatrix} -T_f & T_f L_f \\ -T_r & -T_r T_r \end{bmatrix},$$

$$E1 = \begin{bmatrix} -1 & L_f \\ -1 & -L_r \end{bmatrix},$$

$$B1 = \begin{bmatrix} 2T_f & 2T_r \\ -2T_f L_{fr} & 2T_r L_r \end{bmatrix},$$

$$D1 = \begin{bmatrix} T_f & 0 \\ 0 & T_r \end{bmatrix},$$

$$F1 = \begin{bmatrix} 1 & 0 \\ 0 & 1 \end{bmatrix}$$

$$A(s) = \begin{bmatrix} A1^{-1} B1 \\ C1 A1^{-1} B1 + D1 \\ E1 A1^{-1} B1 + F1 \end{bmatrix} \quad (6)$$

The matrix A is the vehicle motion model matrix representing the mechanical vehicle motion model of the vehicle, and the vehicle body state quantities can be calculated by letting the matrix A act on the road surface inputs.

Next, the wheel speed influencing element model will be described. In the first embodiment, the model will be described with respect to the case where three wheel speed influencing elements, i.e., the quantity of influence due to pitch about the center of gravity of the vehicle body, the quantity of influence of the suspension geometry, and the quantity of influence of change in the rolling radius of the wheel, are included as elements that influence the wheel speed.

Figure 3A:
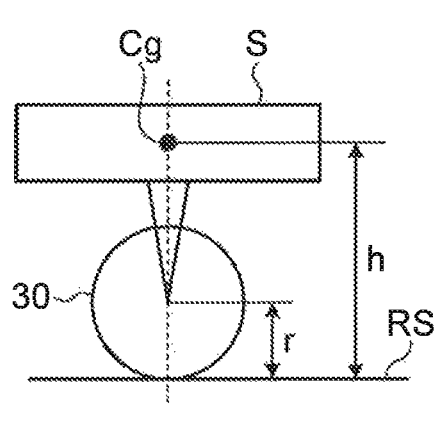
Figure 3B:
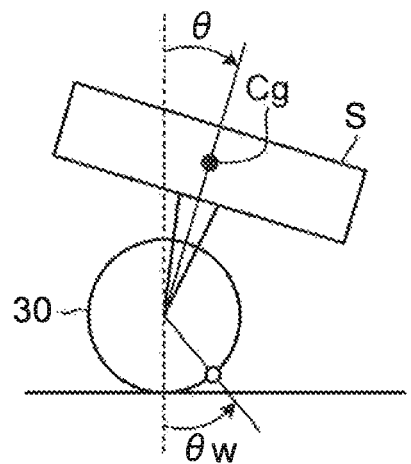

FIG. 3A and FIG. 3B are views useful for explaining the quantity of influence due to pitch about the center of gravity of the vehicle body as an element that influences the wheel speed. In this example, a main body portion of the wheel speed sensor is provided in the vehicle body (rigid body S), and rotation of a detected body provided on a wheel is detected by the main body portion of the sensor, so that the wheel angular velocity is obtained as the wheel speed.

The quantity of influence exerted by pitch about the gravity center Cg of the vehicle body on the wheel angular velocity will be considered. When a pitch motion takes place as shown in FIG. 3A and FIG. 3B, the quantity of influence due to pitch about the center of gravity of the vehicle body on the wheel angular velocity is approximately represented by Eq. (7) below as angular velocity $\omega_{body}$, where two rotations occur due to pitch about the center of gravity Cg of the vehicle body, namely, $\theta$ is rotation of a carrier on which the wheel speed center is mounted, and $\theta_w$ is rotation of the wheel due to forward/backward movement of the wheel 30 (wheel 30F or wheel 30R).

$$\omega_{body} = -(\dot{\theta}_w + \dot{\theta}) = -\left(\frac{h-r}{r}\dot{\theta} + \dot{\theta}\right) = -\frac{h}{r}\dot{\theta} \quad (7)$$

Figure 4:
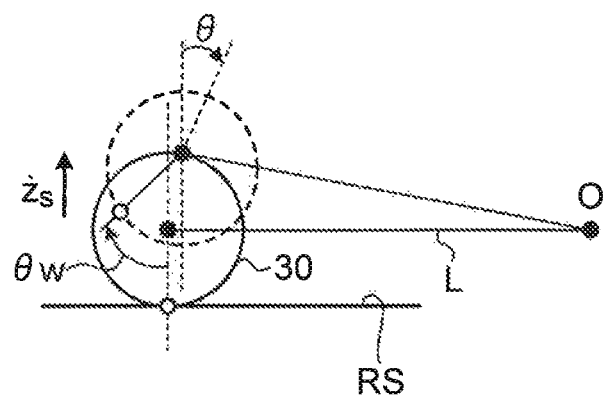
FIG. 4 is a view useful for explaining the suspension geometry influence quantity as an element influencing the wheel speed.

FIG. 4 is a view useful for explaining the suspension geometry influence quantity due to geometric specifications of a suspension as an element that influences the wheel angular velocity. Symbol o denotes an instantaneous center of the suspension as seen in a side view of the vehicle. Symbol L denotes a distance from the instantaneous center o to the center of the wheel 30. In FIG. 4, $\theta$ is rotation of the carrier based on a change of the position of the periphery of the wheel 30 when it changes from a position indicated by a solid line to a position indicated by a broken line, and $\theta_w$ is rotation of the wheel due to forward/backward movement of the wheel 30. In this case, a translational component (a component along the longitudinal direction of the vehicle) and a rotational component of the suspension geometry influence quantity are approximately represented by Eqs. (8a) below, as angular velocities $\omega_{sust}$, $\omega_{susb}$, where $\tan\theta_t$ is equal to $\tan\theta_w$, and $dz_s/dt$ is the velocity of the center of the wheel 30 in the z direction. The suspension geometry influence quantity is approximately represented by Eq. (8b) below, as an angular velocity $\omega_{sus}$ that is the sum of $\omega_{sust}$ and $\omega_{susb}$, where $\theta_b$ is an anti-dive angle or anti-lift angle.

$$\omega_{sust} = \frac{\tan\theta_t}{r}\dot{z}_s, \quad \omega_{susb} = \frac{1}{L}\dot{z}_s \quad (8a)$$

$$\omega_{sus} = \omega_{sust} + \omega_{susb} = \frac{\dot{z}_s}{r}\left(\tan\theta_t + \frac{r}{L}\right) = \frac{\tan\theta_b}{r}\dot{z}_s \quad (8b)$$

Figure 5A:
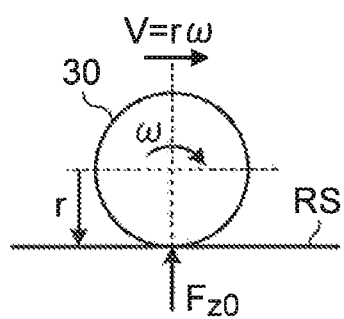
FIG. 5A is view useful for explaining the quantity of influence of change in the rolling radius of the wheel as an element influencing the wheel speed.
Figure 5B:
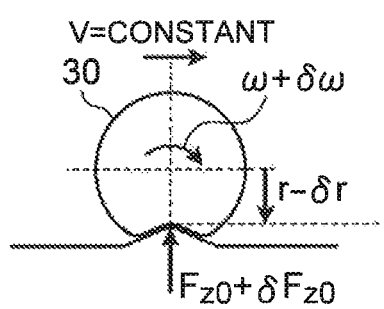
FIG. 5B is a view useful for explaining the quantity of influence of change in the rolling radius of the wheel as an element influencing the wheel speed.

FIGS. 5A and 5B are views useful for explaining the quantity of influence of change in the wheel rolling radius) as an element that influences the wheel angular velocity. In FIG. 5A, V is the rotational velocity of the wheel 30 when the road surface RS is flat, and r is the rolling radius, while $\omega$ is the angular velocity. $F_{z0}$ is force which the wheel 30 receives from the road surface RS. As shown in FIG. 5B, when there is a bump on the road surface RS, $F_{z0}$ changes into $F_{z0}+\delta F_{z0}$, $\omega$ changes into $\omega+\delta\omega$, and the rolling radius r of the wheel 30 changes into $r-\delta r$, while V remains constant.

In this case, $\omega$ satisfies the relationships as indicated in Eqs. (9a). Also, the quantity of influence of change in the wheel rolling radius is approximately represented by Eq. (9b) as an angular velocity $\omega_{tire}$. In Eq. (9b), $df_{tire}$ is an infinitesimal change of $F_{z0}$, and $k_t$ is the modulus of elasticity of the wheel 30. Also, $\eta$ is the ratio of a gradient of the rolling radius relative to the load, to a gradient of the static-load radius of the wheel 30 relative to the load.

$$\omega = \frac{V}{r}, \quad \frac{\partial\omega}{\partial r} = -\frac{V}{r^2} \quad (9a)$$

-continued $$\omega_{tire} = -\frac{V}{r^2}dr = -\frac{V}{r^2}\frac{dr}{df_{tire}}df_{tire} = -\frac{V}{r^2}\frac{-\eta}{k_t}df_{tire} = \frac{V\eta}{k_t r^2}df_{tire} \quad (9b)$$

In view of the model including the three influencing quantities that influence the wheel angular velocity, the wheel angular velocity ω is expressed by the following equation (10), from Eqs. (7), (8b), and (9b) above.

$$\omega = a_1 F_z + a_2 \dot{\theta} + a_3 \dot{z}_s \quad (10)$$

In Eq. (10), coefficients $a_1$, $a_2$, $a_3$ are different between the wheel 30F as a front wheel and the wheel 30R as a rear wheel, and are indicated in rows denoted as $F_r$, $R_r$, respectively, in TABLE 1, with respect to the wheel angular velocities $\omega_f$, $\omega_r$ for the wheels 30F, 30R. Here, parameters suffixed with "f" and "r" indicate those associated with the wheel 30F and the wheel 30R, respectively. $R_w$ denotes the rolling radius of the wheel. Also, $\theta_r$ is an anti-lift angle, and $\theta_f$ is an anti-dive angle.

TABLE 1

|    | $a_1$ | $a_2$ | $a_3$ |
|----|-------|-------|-------|
| Fr | $\dfrac{V\eta_f}{K_{tf}R_{wr}^2}$ | $-\dfrac{h}{R_{wf}}$ | $\dfrac{\tan\theta_f}{R_{wf}}$ |
| Rr | $\dfrac{V\eta_r}{K_{tr}R_{wr}^2}$ | $-\dfrac{h}{R_{wr}}$ | $\dfrac{\tan\theta_r}{R_{wr}}$ |

Accordingly, the wheel angular velocities $\omega_f$, $\omega_r$ are represented by Eqs. (11) using Laplace transform. Further, if Eqs. (11) is expressed in the form of a matrix, it is expressed as a 2×6 matrix B(s) (which will be simply referred to as "matrix B") as indicated in Eq. (12).

$$\begin{aligned}\omega_f &= a_{1f}F_{zf} + a_{2f}\dot{\theta} + a_{3f}\dot{z}_{sf} = a_{1f}F_{zf} + a_{2f}\theta s + a_{3f}z_{sf}s \\ \omega_r &= a_{1r}F_{zr} + a_{2r}\dot{\theta} + a_{3r}\dot{z}_{sr} = a_{1r}F_{zr} + a_{2r}\theta s + a_{3r}z_{sr}s\end{aligned} \quad (11)$$

$$\begin{pmatrix}\omega_f \\ \omega_r\end{pmatrix} = \begin{bmatrix} 0 & a_{2f}s & a_{1f} & 0 & a_{3f}s & 0 \\ 0 & a_{2r}s & 0 & a_{1r} & 0 & a_{3r}s \end{bmatrix}\begin{pmatrix} z \\ \theta \\ F_{zf} \\ F_{zr} \\ z_{sf} \\ z_{sr} \end{pmatrix} = B(s)\begin{pmatrix} z \\ \theta \\ F_{zf} \\ F_{zr} \\ z_{sf} \\ z_{sr} \end{pmatrix} \quad (12)$$

The matrix B is the wheel speed influencing element model matrix representing the wheel speed influencing element model, and the wheel angular velocity can be calculated by letting the matrix B act on the vehicle body state quantity.

Accordingly, if Eq. (3) and Eq. (12) as indicated above are used, a vector having the wheel angular velocities $\omega_f$, $\omega_r$ as components is expressed as one obtained by letting a matrix BA as a product of the matrix B and the matrix A acting on (multiplied by) the road surface inputs, as indicated in Eq. (13) below. Also, a vector having the road inputs $z_{wf}$, $z_{wr}$ as components is expressed as one obtained by letting a matrix $(BA)^{-1}$ as the inverse of the matrix BA acting on (multiplied by) the wheel angular velocities, as indicated in Eq. (14) below. Further, a vector having z, θ as body state quantities, and state variables $F_{zf}$, $F_{zr}$, $z_{sf}$, $z_{sr}$ as components is obtained by sequentially letting the matrix $(BA)^{-1}$ and the matrix A acting on (multiplied by) the wheel angular velocities, as indicated in Eq. (15) below. In this manner, all of the vehicle body state quantities, such as dz/dt, and dθ/dt, can be estimated.

$$\begin{pmatrix}\omega_f \\ \omega_r\end{pmatrix} = BA\begin{pmatrix} z_{wf} \\ z_{wr} \end{pmatrix} \quad (13)$$

$$\begin{pmatrix} z_{wf} \\ z_{wr} \end{pmatrix} = (BA)^{-1}\begin{pmatrix}\omega_f \\ \omega_r\end{pmatrix} \quad (14)$$

$$\begin{pmatrix} z \\ \theta \\ F_{zf} \\ F_{zr} \\ z_{sf} \\ z_{sr} \end{pmatrix} = A(BA)^{-1}\begin{pmatrix}\omega_f \\ \omega_r\end{pmatrix} \quad (15)$$

Accordingly, dθ/dt (θs via Laplace transform), for example, can be obtained according to the following equation (16).

$$\begin{aligned}\dot{\theta} &= \theta s \\ &= A(2, :)\begin{pmatrix} z_{wf} \\ z_{wr} \end{pmatrix}\cdot s \\ &= A(2, :)(BA)^{-1}\begin{pmatrix}\omega_f \\ \omega_r\end{pmatrix}\cdot s\end{aligned} \quad (16)$$

Figure 6:
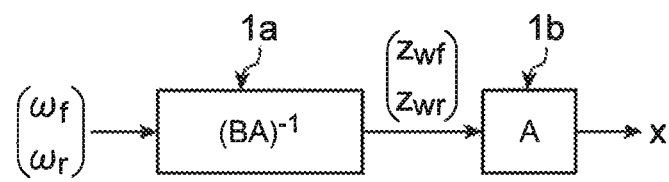
FIG. 6 is a schematic view indicating the functions of the vehicle body state quantity estimating device according to the first embodiment in the form of control blocks.

FIG. 6 is a schematic view indicating the functions of the vehicle body state quantity estimating unit 1 in the form of control blocks. As shown in FIG. 6, the road surface input calculating unit 1a calculates estimated values of the road surface inputs $z_{wf}$, $z_{wr}$ by multiplying a vector having the obtained wheel angular velocities $\omega_f$, $\omega_r$ as components by the inverse matrix $(BA)^{-1}$. The vehicle body state quantity calculating unit 1b calculates estimated values of vector x having z, θ, $F_{zf}$, $F_{zr}$, $z_{sf}$, $z_{sr}$ as components by multiplying a vector having the estimated values of the road surface inputs $z_{wf}$, $z_{wr}$ by the matrix A. The resulting vector x is Laplace transformed, so that estimated values of vehicle body state quantities, such as an estimated value of a pitch rate dθ/dt, can be obtained.

According to the first embodiment, estimated values of the road surface inputs $z_{wf}$, $z_{wr}$ to the wheels are calculated by letting the inverse matrix $(BA)^{-1}$ of the product of the vehicle motion model matrix A and the wheel speed influencing element model matrix B act on the obtained wheel angular velocities $\omega_f$, $\omega_r$, and estimated values of the vehicle body state quantities are calculated by letting the vehicle motion model matrix A further act on the estimated values of the road surface inputs thus calculated. At this time, the wheel speed influencing element model matrix representing the wheel speed influencing element model using at least three wheel speed influencing elements, i.e., the quantity of influence due to pitch about the center of gravity of the vehicle, suspension geometry influencing quantity, and the quantity of influence of change in the rolling radius of the vehicle, is used. With this model matrix used, the estimated values of the vehicle body state quantities can be calculated in view of the influences of the three wheel speed influencing elements on the wheel speed; therefore, the vehicle body state quantities can be estimated with higher accuracy.

Second Embodiment

A vehicle state quantity estimating device according to a second embodiment of the invention will be described. The vehicle body state quantity estimating device according to the second embodiment has substantially the same configuration as the vehicle body state quantity estimating unit 1 according to the first embodiment; therefore, only differences will be described.

In the vehicle body state quantity estimating device according to the second embodiment, the normalized moment of inertia of the vehicle body of the vehicle is set to 1, in the mechanical vehicle motion model of the vehicle body of the vehicle 10 shown in FIGS. 3A and 3B. As a result, masses $m_f(=m_b \times L_r/(L_r+L_f))$, $m_r(=m_b \times L_f/(L_r+L_f))$ are regarded as being placed on the axle of the front wheel and the axle of the rear wheel, respectively, and therefore, the matrix A and the matrix $(BA)^{-1}$ are diagonalized.

Figure 7:
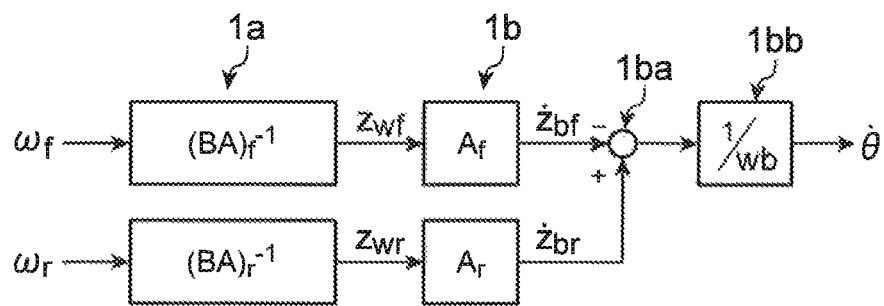
FIG. 7 is a schematic view indicating functions of a vehicle body state quantity estimating device according to a second embodiment of the invention in the form of control blocks.

FIG. 7 is a schematic view indicating the functions of the vehicle body state quantity estimating device according to the second embodiment in the form of control blocks. Since the matrix A and the matrix $(BA)^{-1}$ are diagonalized, as described above, the road surface input calculating unit 1a calculates an estimated value of the road surface input $z_{wf}$ by letting elements $(BA)_f^{-1}$ associated with the front wheel, out of the matrix $(BA)^{-1}$, act on the wheel angular velocity $\omega_f$ as one of the obtained wheel angular velocities $\omega_f$, $\omega_r$. The vehicle body state quantity calculating unit 1b calculates an estimated value of $dz_{bf}/dt$, by letting elements $A_f$ associated with the front wheel, out of the matrix A, act on the estimated value of the road surface input $z_{wf}$. Also, independently of the above calculation, the road surface input calculating unit 1a calculates an estimated value of the road surface input $z_{wr}$ by letting elements $(BA)_r^{-1}$ associated with the rear wheel, out of the matrix $(BA)^{-1}$, act on the obtained wheel angular velocity $\omega_r$. The vehicle body state quantity calculating unit 1b calculates an estimated value of $dz_{br}/dt$ by letting elements $A_r$ associated with the rear wheel, out of the matrix A, act on the estimated value of the road surface input $z_{wr}$. Further, the vehicle body state quantity calculating unit 1b can estimate an estimated value of pitch rate $d\theta/dt$, by obtaining a difference between the estimated value of $dz_{br}/dt$ and the estimated value of $dz_{bf}/dt$ by means of a subtractor 1ba, and dividing the difference by wb by means of a divider 1bb. Here, wb is a wheel base ($=L_r+L_f$).

According to the second embodiment, the estimated values associated with the front wheel and the estimated values associated with the rear wheel can be calculated independently of each other; therefore, a load of computation on the vehicle body state quantity estimating device is reduced.

Third Embodiment

A vehicle body state quantity estimating device according to a third embodiment of the invention will be described. The vehicle body state quantity estimating device according to the third embodiment has substantially the same configuration as the vehicle body state quantity estimating unit 1 according to the first embodiment; therefore, only differences will be described.

In the vehicle body state quantity estimating device according to the third embodiment, too, the normalized moment of inertia of the vehicle body of the vehicle is set to 1, in the mechanical vehicle motion model of the vehicle body of the vehicle 10. Therefore, the matrix A and the matrix $(BA)^{-1}$ are diagonalized.

Figure 8:
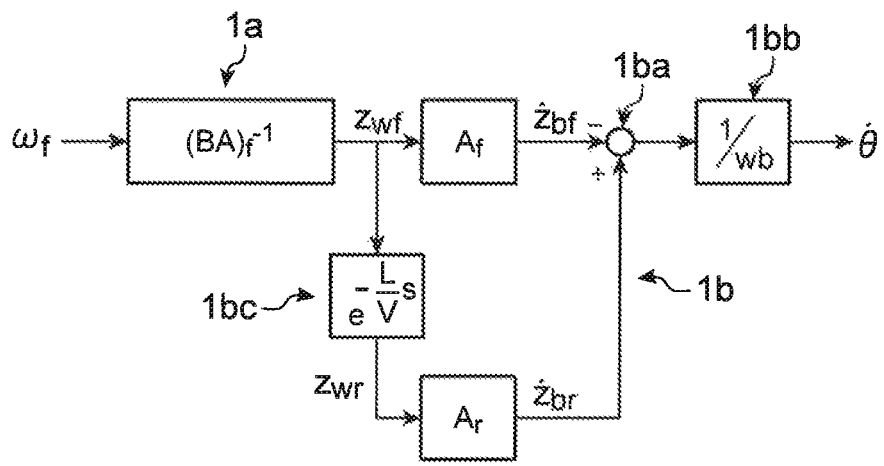
FIG. 8 is a schematic view indicating functions of a vehicle body state quantity estimating device according to a third embodiment of the invention in the form of control blocks.

FIG. 8 is a schematic view indicating the functions of the vehicle body state quantity estimating device according to the third embodiment in the form of control blocks. Since the matrix A and the matrix $(BA)^{-1}$ are diagonalized, as described above, the road surface input calculating unit 1a calculates an estimated value of the road surface input $z_{wf}$ by letting elements $(BA)_f^{-1}$ associated with the front wheel, out of the matrix $(BA)^{-1}$, act on the obtained wheel angular velocity $\omega_f$. The vehicle body state quantity calculating unit 1b calculates an estimated value of $dz_{bf}/dt$, by letting elements $A_f$ associated with the front wheel, out of the matrix A, on the estimated value of the road surface input $z_{wf}$. Also, independently of this calculation, the vehicle body state quantity calculating unit 1b calculates an estimated value of the road surface input $z_{wr}$ from the road surface input $z_{wf}$, by applying a wheel base filter 1bc to the calculated road surface input $z_{wf}$, and calculates an estimated value of $dz_{br}/dt$, by letting the elements $A_r$ associated with the rear wheel, out of the matrix A, further act on the estimated value of road surface input $z_{wr}$. The wheel base filter 1bc lets a wheel base delay quantity ($e^{-(L/V)s}$, where V is vehicle speed, and L is wheel base ($=L_f+L_r$)) act on the calculated road surface input $z_{wf}$. Further, the vehicle body state quantity calculating unit 1b can obtain an estimated value of pitch rate $d\theta/dt$, by calculating a difference between the estimated value of $dz_{br}/dt$ and the estimated value of $dz_{bf}/dt$ by means of a subtractor 1ba, and dividing the difference by wb by means of a divider 1bb.

According to the third embodiment, the estimated value of the road surface input $z_{wr}$ of the rear wheel is calculated using the estimated value of the road surface input $z_{wf}$ of the front wheel, and subsequent calculation of estimated values is conducted independently with respect to the front wheel and the rear wheel. Therefore, the load of computation on the vehicle body state quantity estimating device is reduced.

Next, as an example of the invention, a driving experiment was conducted on a vehicle on which the vehicle body state quantity estimating device based on the first embodiment was installed, and the pitch rate of the vehicle body was measured by a sensor provided in the vehicle body, and was compared with the pitch rate estimated by the vehicle body state quantity estimating device.

Figure 9A:
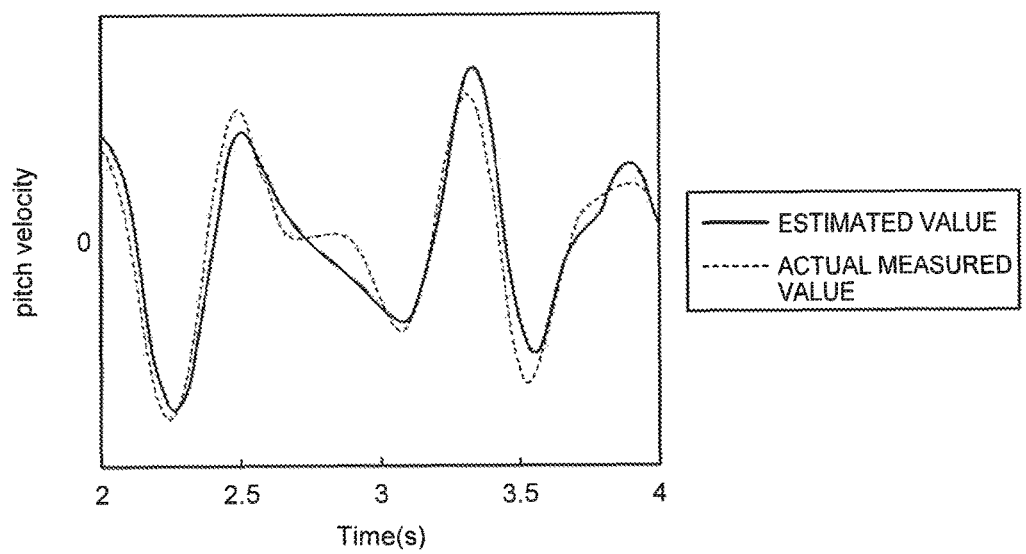
Figure 9B:
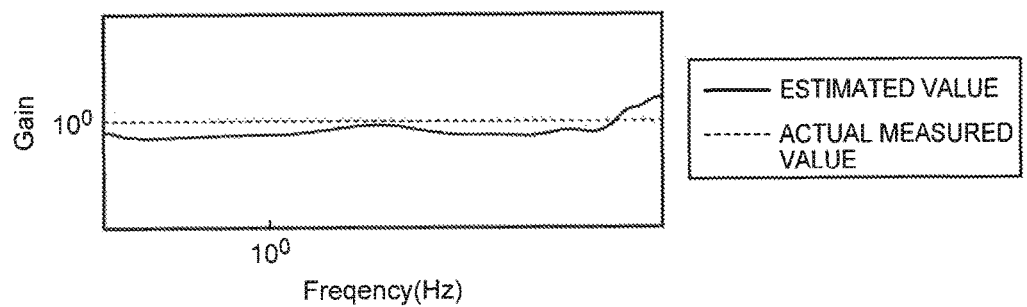
Figure 9C:
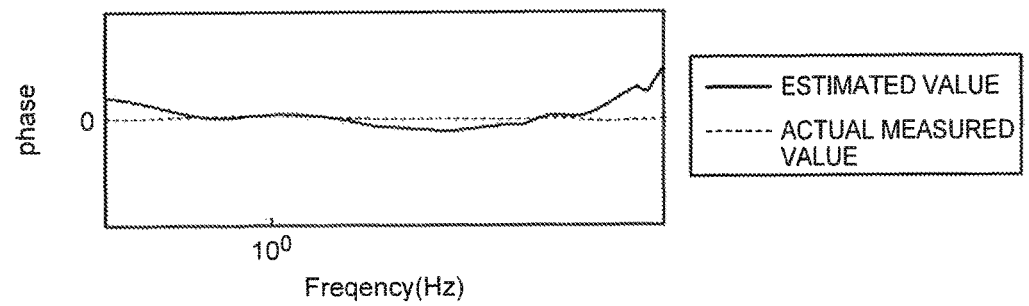

FIG. 9A-FIG. 9C indicate estimated values and actual measured values of the pitch rate and transfer functions relating to these values, in the example of the vehicle body state quantity estimating device according to the first embodiment. FIG. 9A shows changes in the estimated value and actual measured value of the pitch rate with time. FIG. 9B and FIG. 9C show frequency distributions of the gain ratio and phase ratio of values each obtained by dividing the estimated value by the actual measured value, using logarithmic axes. In each of FIGS. 9A-9C, the solid line indicates the estimated value, and the broken line indicates the actual measured value. As shown in FIG. 9B and FIG. 9C, the gain ratio is close to 1, and the phase ratio is close to zero, from which it was confirmed that the estimated values were estimated with high accuracy relative to the actual measured values.

The vehicle state quantities estimated by the vehicle body state quantity estimating device according to each of the above-described embodiments can be used for damping control of the vehicle 10 performed according to the configuration and method similar to those in the case of JP 2011-17303 A.

When damping control is performed, for example, when vibration having a frequency component of 1-4 Hz, more specifically, around 1.5 Hz, occurs to the vehicle 10 in pitch direction or bounce direction, due to input from the road surface to the wheels 30FL, 30FR as the left and right front wheels of the vehicle 10 and the wheels 30RL, 30RR as the left and right rear wheels, the ECU 50 may be configured to suppress the vibration, by controlling the power source 21 so as to generate drive torque of the opposite phase, thereby to adjust "wheel torque" (torque that acts between the wheel and the road surface in contact with the wheel) applied from the wheel (drive wheel when driving) to the road surface. Then, the ECU 50 controls power of the power source 21, or drive torque, so as to perform wheel torque control to generate damping torque as wheel torque that suppresses sprung-mass vibration, in the wheels 30RL, 30RR as drive wheels for transmitting drive torque to the road surface, and thus suppress the vibration. With the damping control executed by the ECU 50, the damping torque is applied to the wheels 30RL, 30RR, so as to suppress the sprung-mass vibration.

The suspension mechanisms 80FL, 80FR, 80RL, 80RR may be constructed as active suspensions, and the ECU 50 may be configured to actively control the suspension mechanisms 80FL, 80FR, 80RL, 80RR based on the estimated vehicle state quantities, so as to perform attitude control on the vehicle 10.

While the bicycle model is used as the mechanical vehicle motion model of the vehicle 10 in the vehicle body state quantity estimating device according to each of the above-described embodiments, the invention is not limited to the use of the bicycle model. For example, a four-wheel model may be used as the vehicle motion model, and the estimating device may receive the wheel speeds VwFL, VwFR, VwRL, VwRR obtained from the wheel speed sensors 40FL, 40FR, 40RL, 40RR for the respective wheels 30FL, 30FR, 30RL, 30RR, as the wheel angular velocities, for example. Then, the estimating device may estimate the roll rate of the vehicle, for example, by calculating estimated values using a vehicle motion model matrix representing a vehicle motion model corresponding to the four-wheel model, and a wheel speed influencing element model matrix representing a wheel speed influencing element model using the above-described three wheel speed influencing elements.

While the vehicle body state quantity estimating device according to each of the above-described embodiments lets the inverse matrix of the product of the vehicle motion model matrix and the wheel speed influencing element model matrix act on the wheel speed, a Kalman filter may be used in place of the matrices.

It is to be understood that this invention is not limited by the above-described embodiments, but the invention includes those configured by appropriately combining constituent elements of the respective embodiments as described above. Further effects and modified example may be easily derived from the above description by those skilled in the art. Thus, further extended forms of the invention are not limited to the above-described embodiments, but various changes or modifications can be made.

What is claimed is:

1. A vehicle body state quantity estimating device for a vehicle including a wheel speed sensor that obtains a wheel speed of a wheel mounted on the vehicle, comprising:
    a road surface input calculating unit that calculates an estimated value of a road surface input value on the wheel, using an inverse matrix of a product of a vehicle motion model matrix and a wheel speed influencing element model matrix for the obtained wheel speed, the vehicle motion model matrix representing a mechanical vehicle motion model of the vehicle, the wheel speed influencing element model matrix representing a wheel speed influencing element model using three wheel speed influencing elements as elements that influence the wheel speed, the wheel speed influencing elements comprising a pitch about a center of gravity of a vehicle body, a suspension geometry quantity based on a center of a suspension of the vehicle, and a change in a rolling radius of the wheel;
    a vehicle body state quantity calculating unit that calculates an estimated value of a vehicle body state quantity using the vehicle motion model matrix on the estimated value of the road surface input calculated by the road surface input calculating unit; and
    using, in a damping control system, the estimated value of the vehicle body state quantity to control a power source of the vehicle.

2. The vehicle body state quantity estimating device according to claim 1, wherein:
    a normalized moment of inertia of the vehicle body of the vehicle is 1, in the vehicle motion model;
    the wheel speed comprises a wheel speed of a front wheel of the vehicle and a wheel speed of a rear wheel of the vehicle;
    the road surface input comprises a road surface input to the front wheel of the vehicle and a road surface input to the rear wheel; and
    the road surface input calculating unit calculates an estimated value of a road surface input to the front wheel, using elements of the inverse matrix associated with the front wheel based on the obtained wheel speed of the front wheel, and calculates an estimated value of a road surface input to the rear wheel, using elements of the inverse matrix associated with the rear wheel based on the obtained wheel speed of the rear wheel.

3. The vehicle body state quantity estimating device according to claim 1, wherein:
    a normalized moment of inertia of the vehicle body of the vehicle is 1, in the vehicle motion model;
    the wheel speed comprises a wheel speed of a front wheel of the vehicle; and
    the road surface input calculating unit calculates an estimated value of a road surface input to the front wheel, using elements of the inverse matrix associated with the front wheel based on the obtained wheel speed of the front wheel, and calculates an estimated value of a road surface input to a rear wheel, using wheel base delay amount of the vehicle based on the estimated value of the road surface input to the front wheel.

4. A damping control system of a vehicle, comprising:
    a sensor that obtains a wheel speed of the vehicle; and
    an electronic control unit configured to
        calculate an estimated value of a road surface input value on the wheel, using an inverse matrix of a product of a vehicle motion model matrix and a wheel speed influencing element model matrix for the obtained wheel speed, the vehicle motion model matrix representing a mechanical vehicle motion model of the vehicle, the wheel speed influencing element model matrix representing a wheel speed influencing element model using three wheel speed influencing elements as elements that influence the wheel speed, the wheel speed influencing elements comprising a pitch about a center of gravity of a vehicle body, a suspension geometry based on a center of a suspension of the vehicle, and a change in a rolling radius of the wheel, calculate an estimated value of a vehicle body state quantity using the vehicle motion model matrix act on the calculated estimated value of the road surface input, and control a power source of the vehicle based on the estimated value of the vehicle body state quantity.

* * * * *